United States Patent
Khodor

(10) Patent No.: US 10,131,374 B1
(45) Date of Patent: Nov. 20, 2018

(54) FOLDABLE HAND TRUCK CAPABLE OF TRAVERSING OBSTACLES

(71) Applicant: TRIFOLD, LLC, Orange, OH (US)

(72) Inventor: Leonid Khodor, Orange, OH (US)

( * ) Notice: Subject to any disclaimer, the term of this patent is extended or adjusted under 35 U.S.C. 154(b) by 0 days.

(21) Appl. No.: 15/904,056

(22) Filed: Feb. 23, 2018

(51) Int. Cl.
- B62B 1/04 (2006.01)
- B62B 5/02 (2006.01)
- B62B 3/02 (2006.01)
- B62B 5/06 (2006.01)

(52) U.S. Cl.
CPC .......... B62B 5/026 (2013.01); B62B 1/04 (2013.01); B62B 1/045 (2013.01); B62B 3/022 (2013.01); B62B 5/065 (2013.01); B62B 2205/12 (2013.01); B62B 2205/18 (2013.01); B62B 2205/33 (2013.01); B62B 2206/06 (2013.01); B62B 2301/08 (2013.01); B62B 2301/254 (2013.01)

(58) Field of Classification Search
CPC ......... B62B 1/042; B62B 1/002; B62B 1/008; B62B 1/12; B62B 1/125; B62B 3/022; B62B 3/02; B62B 1/045; B62B 1/04; A45C 5/14; A45C 13/385; A63C 11/026
See application file for complete search history.

(56) References Cited

U.S. PATENT DOCUMENTS

| | | | |
|---|---|---|---|
| 2,699,951 A | | 1/1955 | Gans |
| 5,348,325 A * | 9/1994 | Abrams | B62B 1/12 280/40 |
| 5,468,005 A * | 11/1995 | Yang | B62B 1/12 280/40 |
| 5,630,601 A | 5/1997 | vom Braucke | |
| 5,803,471 A * | 9/1998 | DeMars | B62B 1/125 280/40 |
| 5,984,327 A * | 11/1999 | Hsieh | A45C 13/385 280/38 |
| 6,425,599 B1 * | 7/2002 | Tsai | B62B 1/125 280/40 |
| 6,874,799 B2 | 4/2005 | Roberson | |
| 7,097,183 B1 * | 8/2006 | Su | B62B 1/12 280/40 |
| 7,387,306 B2 * | 6/2008 | Zimmer | B62B 1/125 280/40 |
| 7,631,380 B1 | 12/2009 | Larson | |
| 7,669,862 B2 * | 3/2010 | Kamara | A45C 5/14 180/8.1 |
| 8,641,059 B2 | 2/2014 | Khodor | |
| 9,187,106 B2 | 11/2015 | Khodor | |

(Continued)

Primary Examiner — Joseph M Rocca
Assistant Examiner — Daniel S Yeagley

(57) ABSTRACT

Disclosed is a folding hand truck capable of moving over uneven or spongy surfaces and surmounting obstacles. The chassis includes a frame having a lower end and a reference plane, a platform attached rotatable around pivot axis to said lower end, two arms, each having a first axis and a second axis, each of said arms attached rotatable around the first axis to said lower end and configured for attaching a wheel arrangement rotatable around the second axis and having a diameter at least equal to a half of a width of said frame, and two intermediate elements, each of said intermediate elements configured for synchronizing motions of said platform and one of said arms providing for said platform and said arms linearly interdepended rotation.

8 Claims, 4 Drawing Sheets

(56) References Cited

U.S. PATENT DOCUMENTS

| | | | |
|---|---|---|---|
| 9,199,655 B1* | 12/2015 | Su | B62B 1/125 |
| 2002/0185844 A1* | 12/2002 | Gregory | A63C 11/026 |
| | | | 280/652 |
| 2007/0075509 A1 | 4/2007 | Wyrick, III | |
| 2007/0222165 A1 | 9/2007 | Hope | |
| 2011/0285113 A1* | 11/2011 | Su | B62B 1/12 |
| | | | 280/654 |
| 2012/0292889 A1* | 11/2012 | Khodor | B62B 1/12 |
| | | | 280/651 |
| 2013/0049333 A1* | 2/2013 | Yang | B62B 1/12 |
| | | | 280/652 |
| 2015/0137487 A1* | 5/2015 | Su | B62B 3/022 |
| | | | 280/655 |
| 2015/0166088 A1* | 6/2015 | Khodor | B62B 1/042 |
| | | | 280/639 |

* cited by examiner

FOLDABLE HAND TRUCK CAPABLE OF TRAVERSING OBSTACLES

FIELD OF THE INVENTION

The present invention generally relates to manually driven carrier vehicles, such as carts and hand trucks, particularly, to foldable hand trucks capable of traversing obstacles.

BACKGROUND OF THE INVENTION

Various manually driven carrier vehicles, for example, hand trucks and carts are commonly used for moving objects that are otherwise inconvenient for a person to carry due to size and/or weight. Often, these hand trucks and carts are foldable for ease of storage and transportation when not in use. They typically have a telescoping or folding handle, a folding chassis, and wheels either set into a predetermined position or pivotable around longitudinal axes of chassis frame. Such carriers have limited capability to traverse rough or uneven terrain because the portability requirement in the folded state limits the range of possible wheel diameters, which, in turn, limits suspension responsiveness. This is because the efforts of moving a cart at a given coefficient of friction depend inversely on a ratio of wheel to axle diameters and the wheel diameter to height of an obstacle. Other carriers, besides having a telescoping or folding handle and a folding chassis, utilize removable wheels of relatively large size as means to improve terrain trafficability, yet reduce overall dimensions in the folded state. However, removing the wheels requires additional time and complicates handling and storage of the carrier, particularly after use on wet or muddy surfaces.

Thus, conventional folding carts and hand trucks, in addition to be able to transport a predetermined load, are designed primarily for convenient handling and portability when folded. However, these known carriers, independently of any trade-offs between the convenience of use and the size in the folded state, are difficult to handle when moving over an irregular terrain, curbs, stairs, and other obstacles.

Carrier chassis better capable of dealing with uneven surfaces and convenient to store or transport when folded are disclosed in U.S. Pat. No. 8,541,059 and U.S. Pat. No. 9,187,106, the entire contents of which are hereby incorporated by reference. However, the hand truck taught in U.S. Pat. No. 9,187,106, due to common for hand trucks requirement to have the platform at and the wheels above a ground level in unfolded state, comprises a segment of Maltese cross mechanism, which negatively affects performance and increases dimensions and weight of the device as well as complicates the design process due to nonlinear relation between velocities of parts during folding and unfolding.

Therefore, it is desirable to provide a simplified foldable hand truck capable of moving over a rough terrain, including curbs, stairs, and spongy soil and be foldable relatively flat without disassembling.

SUMMARY OF THE INVENTION

The present invention particularly focuses on a manually driven foldable hand truck providing for moving over uneven or spongy surfaces and surmounting obstacles as well as climbing up and down (i.e. "walking") over curbs, and stairs, that is easy to handle, convenient to use, and folds flat. Particularly, in its various embodiments and implementations, the invention provides for a decreased pressure applied by the hand truck onto an underlying terrain, improved stability, decreased pull/push forces especially for moving over the irregular terrain, and improved portability when folded. Furthermore, the present invention facilitates broader participation in outdoor activities by allowing physically challenged persons to go with the carrier anywhere easily.

In general, a foldable hand truck includes a frame having a lower end and a reference plane, a platform having a pivot axis, said platform attached rotatable around said pivot axis to said lower end, two arms, each having a first axis and a second axis, each of said arms attached rotatable around the first axis to said lower end and configured for attaching a wheel arrangement rotatable around the second axis and having a diameter at least equal to a half of a width of said frame, and two intermediate elements, each of said intermediate elements configured for synchronizing motions of said platform and one of said arms, wherein said platform is configured to pivot between at least being generally perpendicular to said frame and being adjacent and parallel to said frame, each of said arms is configured to pivot between at least a first and a second positions of said wheel arrangement, wherein, in the first position, said wheel arrangement is generally perpendicular to said reference plane and wherein, in the second position, said wheel arrangement is adjacent and parallel to said reference plane, and said intermediate elements provide for said platform and said arms linearly interdepended rotation. Various embodiments and implementations of this aspect of the invention include the following features:

Said first axis positioned at acute angles to said reference plane and to a plane perpendicular to said reference plane; each of said intermediate elements is rotatable around an axis parallel to corresponding one of said first axis; said platform being perpendicular to said frame configured to latch said arms in said first position of said wheel arrangement; said platform biased to pivot from an intermediate position to either been generally perpendicular to said frame or been generally adjacent and parallel to said frame; said wheel arrangement may comprise at least one wheel; said wheel arrangement may comprise a plurality of wheels rotatable around axes parallel to said second axis; said wheel arrangement in said first position is configured to extend no lower than said platform been generally perpendicular to said frame and placed on a level surface.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1A:
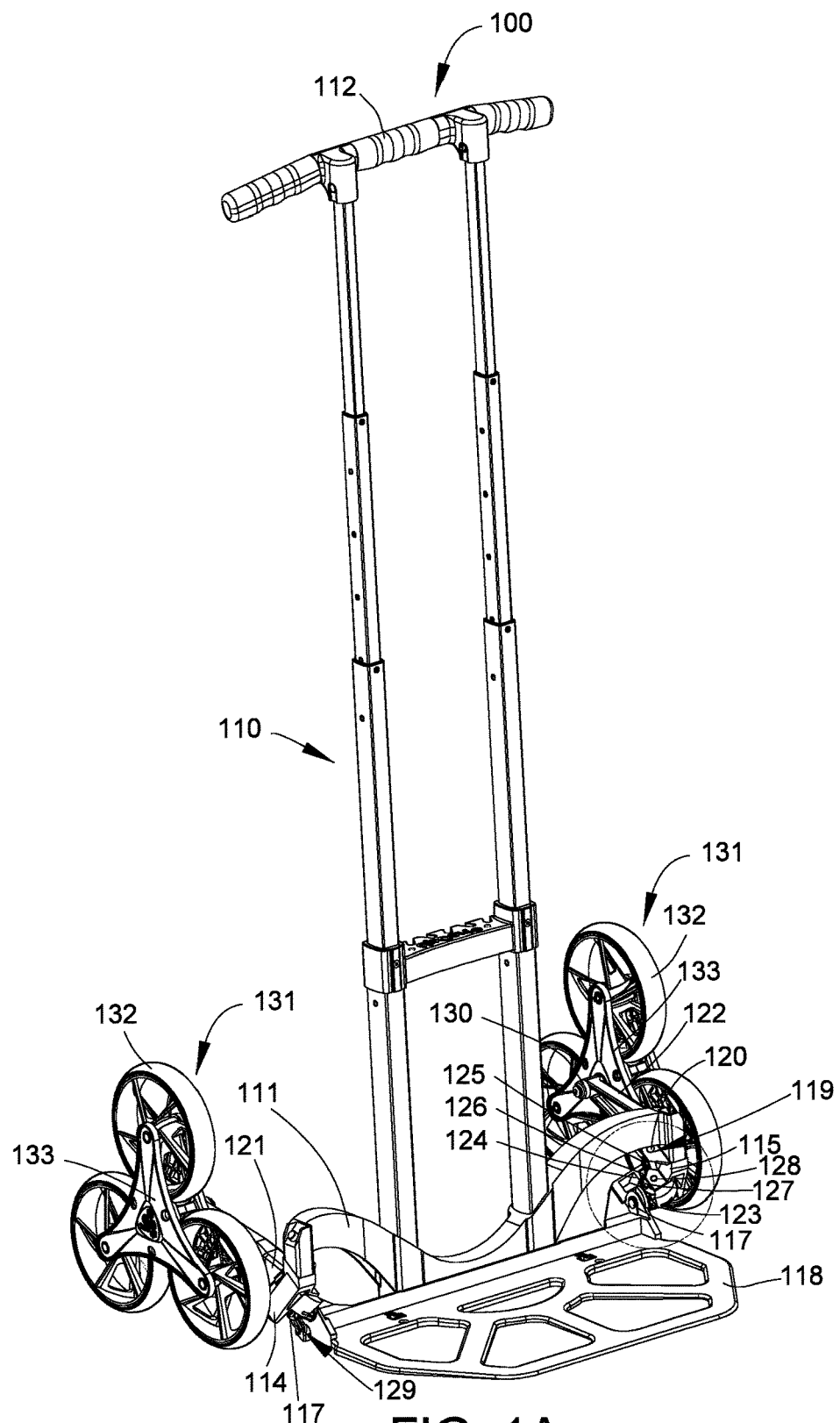
FIGS. 1A and 1B depict respectively a perspective view of an embodiment of a hand truck in unfolded state according to present invention and magnified partial view of elements of the chassis.
Figure 1B:
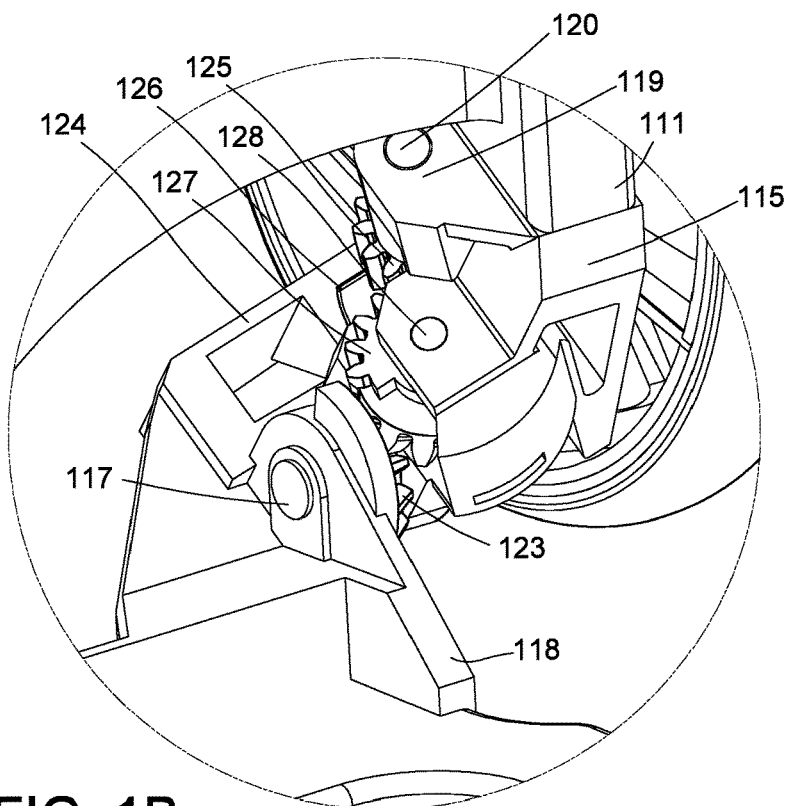
Figure 2:
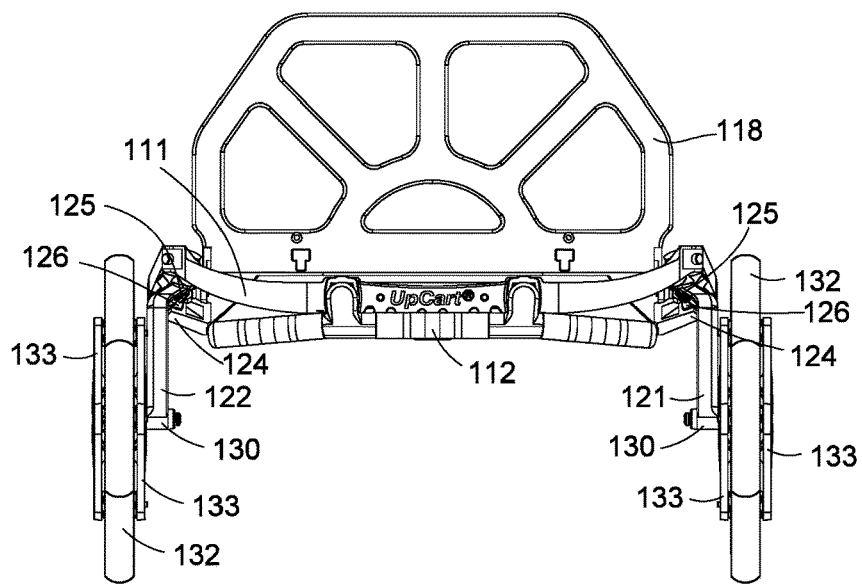
FIG. 2 depicts a top view of the embodiment in unfolded state.
Figure 3B:
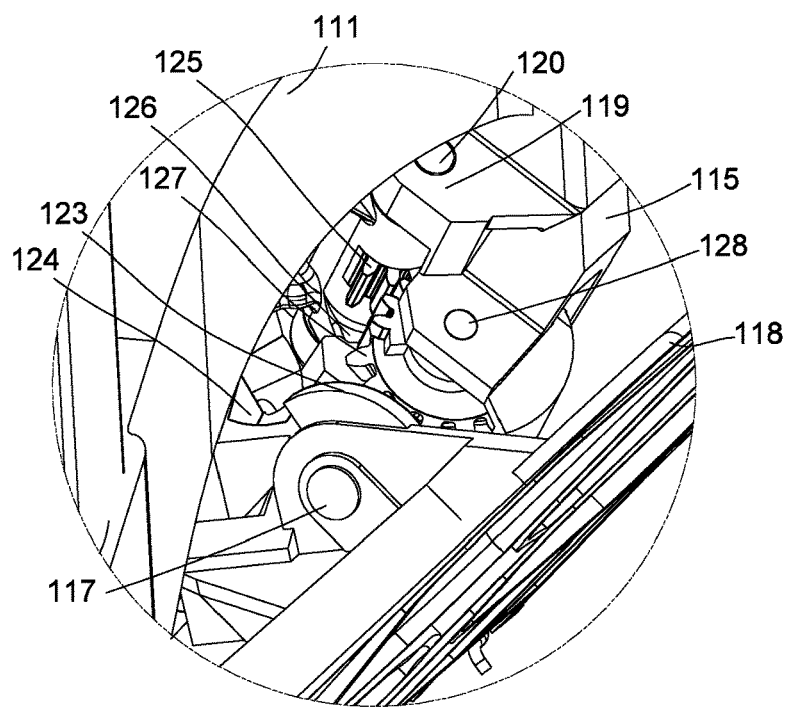
FIGS. 3A, 3B depict respectively a perspective view of the embodiment and magnified partial view of elements of the chassis in a partially folded state.
Figure 3A:
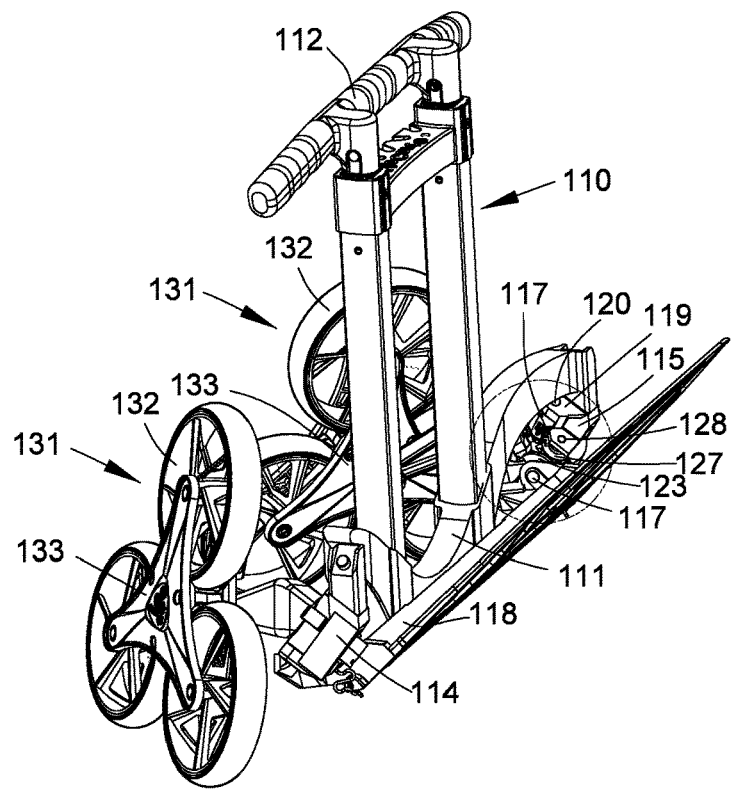
Figure 5:
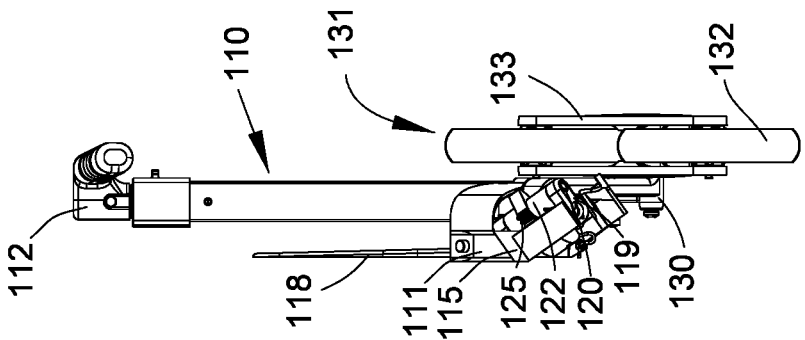
FIGS. 4, 5 depict respectively back and side views of the embodiment in a folded state.
Figure 4:
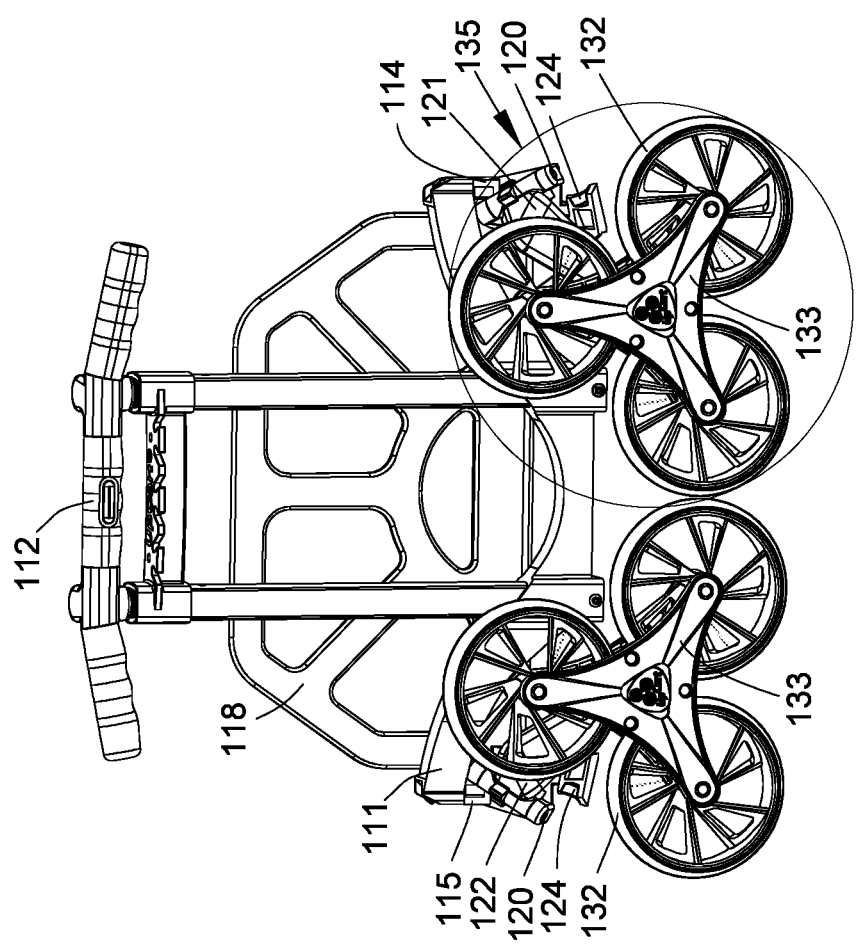

In the following detailed description, for purposes of explanation and not limitation, disclosing specific details is set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the embodiment. Such methods and apparatuses are clearly within the scope of the present teachings. Set forth for better clarity in symmetrical structures, like reference characters may refer to like functioning mirrored parts as well as the same parts.

Referring to FIGS. 1A-5, a generally symmetrical hand truck 100 comprise a telescoping frame 110 with a bridge 111 and a handle 112. The knuckles 114 and 115 are mirror images of each other and may be integral parts of the bridge 111 or attached components. Each of the knuckles 114 and 115 comprise an element 117 for pivoting a platform 118 and an element 119 holding axles 120 that are pivoting axes of respectively arms 121 and 122. The elements 117 and 119 may be holes or pins as integral parts of each of the knuckles 114 and 115 or attached components. The elements 117 are coaxial and the axles 120 in the elements 119 form acute angles with a reference plane (not shown) of the frame 110, the symmetry plane, and the platform 118. The reference plan may be described as a plane through axes of the elements 117 and, generally, in proximity to the frame 110 surface. The angle to the platform 118 as shown in FIGS. 1A and 1B may be in a range from about 30 to about 75°, preferably about 60°, and the angle to the reference plane of the frame 110 may be in a range about from 15 to 55°, preferably about 35°.

The platform 118 comprises bevel gear segments 123 coaxial with the elements 117 and extensions 124 while the arms 121 and 122 comprise spur gear segments 125 and catches 126. Intermediate elements 127 placed within the knuckles 114 and 115 rotatable around axles 128, which are parallel to corresponding axles 120. The element 127 comprises bevel and spur gear segments meshed with corresponding segments 123 and 125. Springs 129 may be placed between the knuckles 114 and 115 and the platform 118 in such manner that the platform 118 would be biased from an intermediate position to one of either folded or unfolded positions.

The arms 121 and 122 are mirror images of each other and each may comprise hinge elements, for example holes, defining an axis of pivoting around the axle 120, a gear segment 125 meshed with the corresponding spur gear segment of the element 127, a catch 126 for engaging the extension 124 in the unfolded position, and an element 130 for attaching a wheel arrangement 131. The element 130, as an axis of rotation, may be a stationary or rotational axle, a flange or, as shown in this embodiment, a boss with a hole. Multiple wheels 132 may be placed rotatable between the side plates 133. A diameter of the wheel arrangement 131 may be defined as a diameter of a circle 135 circumscribing the wheel arrangement. Methods and means of fixing positions of one part relative to another well known in the art so, those of ordinary skill in the art will readily envision a variety of other means and/or structures for performing the function described above.

In the unfolded position, the catches 126 may stop extensions 124 that limits pivoting of the platform 118 to being generally perpendicular to the frame 110, and the arms 121 and 122 being set by the extensions 124 of the platform 118 and latching the catches 126 with the elements 130 generally coaxial. In order to fold the hand truck 100, the frame 110 is contracted and the platform 118 is rotated toward the frame 110. Rotation of the platform 118 causes rotation of the arms 121 and 122 toward the bridge 111 through the gear segments 123, 127, and 125. In the folded state, the arms 121 and 122 are generally aligned with the bridge 111 with the wheel arrangements 131 positioned side by side and adjacent and parallel to one side of the bridge 111 while the platform 118 is generally adjacent and parallel to another side of the bridge 111. It should be noted that the elements 130 with the wheel arrangements 131 positioned relative to the knuckles 114 and 115 lower in the folded state than in unfolded.

Consequently, the present invention provides the improved folding chassis for handling all kinds of terrain including curbs and stairs. Furthermore, the invention provides that such chassis folds relatively flat for better handling and storage in the folded state. Moreover, the present invention facilitates greater self sufficiency for physically challenged persons by easy of use including folding/unfolding without detaching any parts.

While a specific inventive embodiment has been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. For example, a removable track may be fitted over the wheels 132 of each of the arrangements 131 for moving over a sandy or spongy terrain. Alternatively, for this purpose, the arrangement 131 may consist of a single wheel. Those skilled in the art will recognize, or be able to ascertain using no more than routine experimentation, many equivalents to the specific inventive embodiment described herein. It is, therefore, to be understood that the foregoing is presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Accordingly, as indicated above, the foregoing embodiment of the invention is an example and can be varied in many ways. Such present or future variations are not to be regarded as a departure from the spirit and scope of the invention, and all such modifications as would be apparent to one skilled in the art are intended to be included within the scope of the following claims.

All definitions, as defined and used herein, should be understood to control over dictionary definitions, definitions in documents incorporated by reference, and/or ordinary meanings of the defined terms. The indefinite articles "a" and "an", as used herein in the specification and in the claims, unless clearly indicated to the contrary, should be understood to mean "at least one". As used herein, the terms "about" and "generally" refers to a +/−10% variation from the nominal value. It is to be understood that such a variation is always included in any given value provided herein, whether or not it is specifically referred to.

As used herein in the specification and in the claims, the phrase "diameter of a/the wheel arrangement" should be understood to mean the diameter of the smallest circle circumscribing said wheel arrangement.

It should also be understood that, unless clearly indicated to the contrary, in any methods disclosed herein that include more than one step or act, the order of the steps or acts of the method is not necessarily limited to the order in which the steps or acts of the method are recited. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

I claim:

1. A foldable hand truck comprising:
   a frame having a lower end and a reference plane;
   a platform having a pivot axis, said platform attached rotatable around said pivot axis to said lower end and configured to pivot for at least right angle from being generally perpendicular to said frame;
   two arms, each having a first axis and a second axis, each of said arms attached rotatable around the first axis to said lower end and configured for attaching a wheel arrangement rotatable around the second axis and having a diameter at least equal to a half of a width of said frame; and
   two intermediate elements, each of said intermediate elements configured for interaction with said platform and one of said arms,
   wherein each of said arms configured to pivot between at least said wheel arrangement being generally perpendicular to said reference plane and said wheel arrangement being adjacent and parallel to said reference plane, said first axis positioned at acute angles to said reference plane and to a plane perpendicular to said reference plane and have no intersection with said pivot axis, and said intermediate elements provide for said platform and said arms a linearly interdepended rotation.

2. The foldable hand truck of claim 1, wherein each of said intermediate elements is rotatable around an axis parallel to corresponding said first axis.

3. The foldable hand truck of claim 1, wherein said platform and said arms comprise gear segments and said intermediate elements have gear sections corresponding to both said platform and arms gear segments.

4. The foldable hand truck of claim 1, wherein said platform being perpendicular to said frame configured to latch said arms with said wheel arrangement being generally perpendicular to said reference plane.

5. The foldable hand truck of claim 1, wherein said platform biased to pivot from an intermediate position to either being generally perpendicular to said frame or being rotated at least parallel to said frame.

6. The foldable hand truck of claim 1, wherein said wheel arrangement comprise at least one wheel.

7. The foldable hand truck of claim 1, wherein said wheel arrangement comprise a plurality of wheels rotatable around axes parallel to said second axis.

8. The foldable hand truck of claim 1, wherein said wheel arrangement being generally perpendicular to said reference plane is configured to extend no lower than said platform being generally perpendicular to said frame.

* * * * *